No. 785,634. PATENTED MAR. 21, 1905.
A. PATTERSON.
WATER JACKETED BLAST OR OTHER FURNACE.
APPLICATION FILED JUNE 9, 1904.

3 SHEETS—SHEET 1.

No. 785,634. PATENTED MAR. 21, 1905.
A. PATTERSON.
WATER JACKETED BLAST OR OTHER FURNACE.
APPLICATION FILED JUNE 9, 1904.
3 SHEETS—SHEET 2.
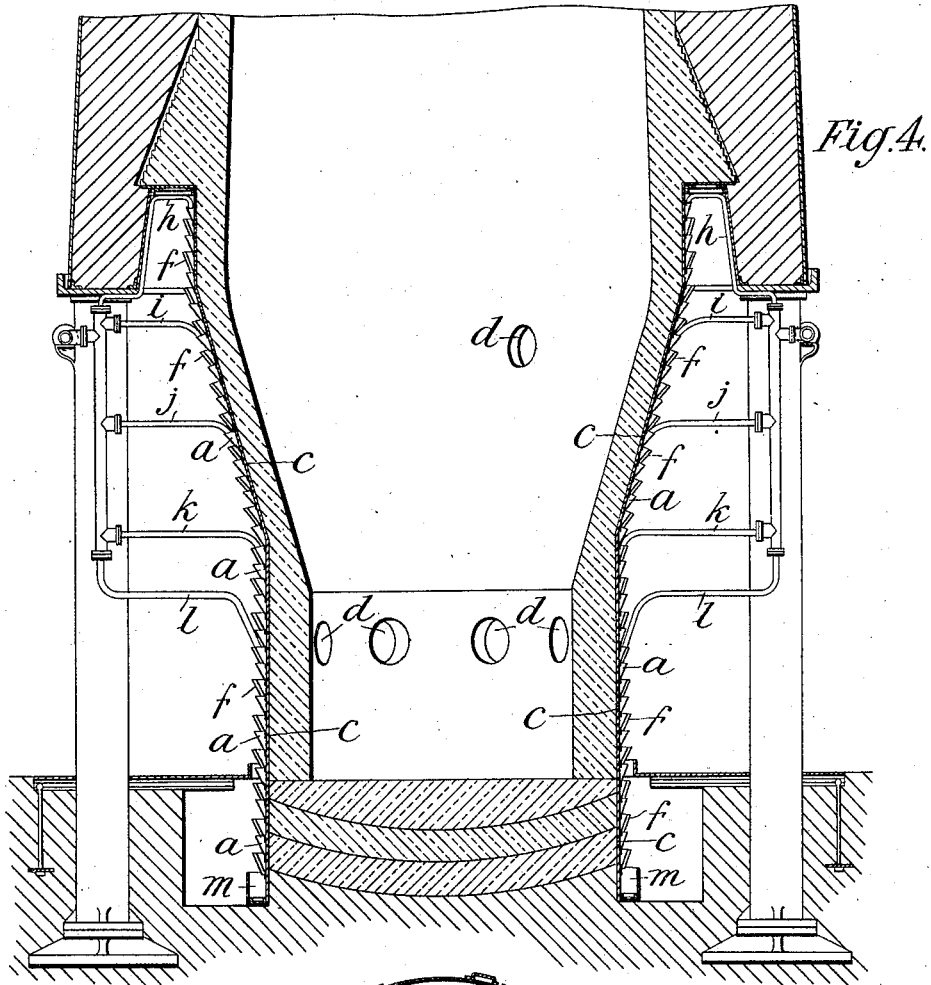
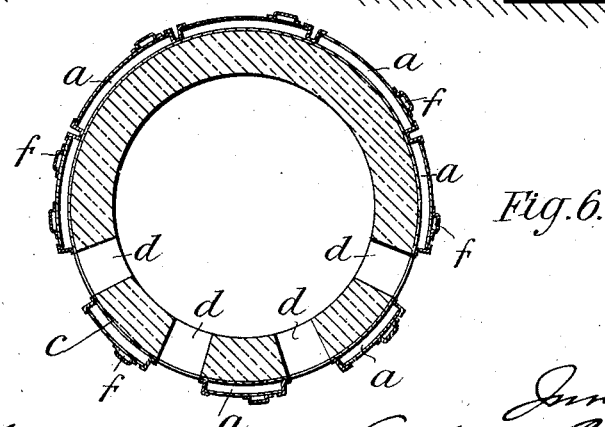

No. 785,634. PATENTED MAR. 21, 1905.
A. PATTERSON.
WATER JACKETED BLAST OR OTHER FURNACE.
APPLICATION FILED JUNE 9, 1904.

3 SHEETS—SHEET 3.

No. 785,634. Patented March 21, 1905.

UNITED STATES PATENT OFFICE.

ANTHONY PATTERSON, OF CARDIFF, ENGLAND.

WATER-JACKETED BLAST OR OTHER FURNACE.

SPECIFICATION forming part of Letters Patent No. 785,634, dated March 21, 1905.

Application filed June 9, 1904. Serial No. 211,839.

*To all whom it may concern:*

Be it known that I, ANTHONY PATTERSON, a British subject, residing at Cardiff, England, have invented certain new and useful Improvements in Water-Jacketing Blast or other Furnaces; and I do hereby declare the following to be a full, clear, and exact description of the invention, such as will enable others skilled in the art to which it appertains to make and use the same.

This invention relates to water-jacketing blast-furnaces and other furnaces—as, for example, cupolas and reheating and melting furnaces.

This invention consists in water-jacketing furnaces by the provision of open-topped water-troughs constructed and arranged as hereinafter described. The troughs are bolted or riveted to the casing plate or plates of the furnace and are arranged around the furnace in successive rings or stages, incasing the furnace or a part or parts thereof in an outer envelop of cooling-troughs, which are kept supplied with running water. The water in each trough overflows into the next below, and so on throughout the series of troughs from the topmost through the series downward to the lowermost, whence the escaping water is received in a discharge draining trough, trench, or gutter. The overflow of water from each trough to the next below may be at a given location or it may take place all along the troughs. Each trough has a screen covering the overflow. The screens serve as wind-guards to the overflowing water, and they also direct the water from each trough to descend to the next below.

Figure 1:
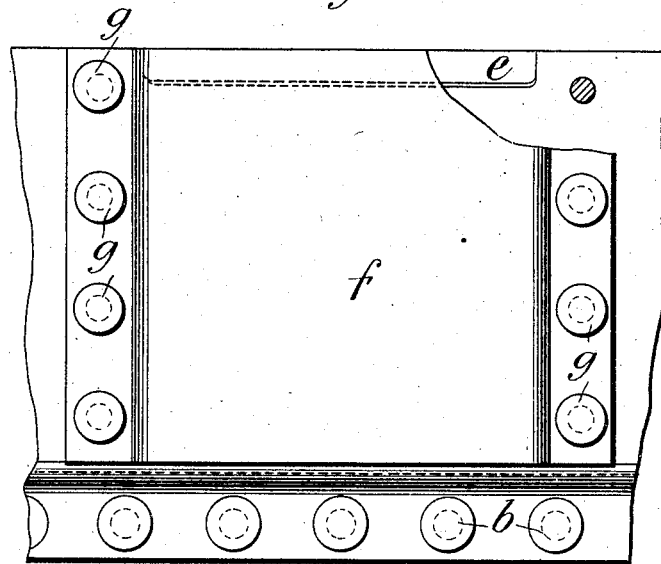
Figure 2:
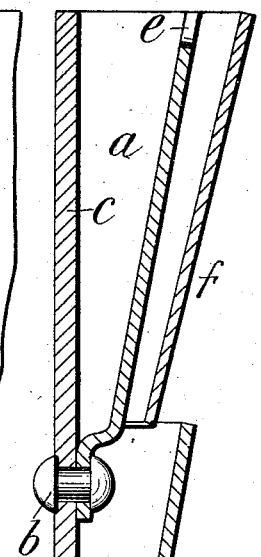
Figure 3:
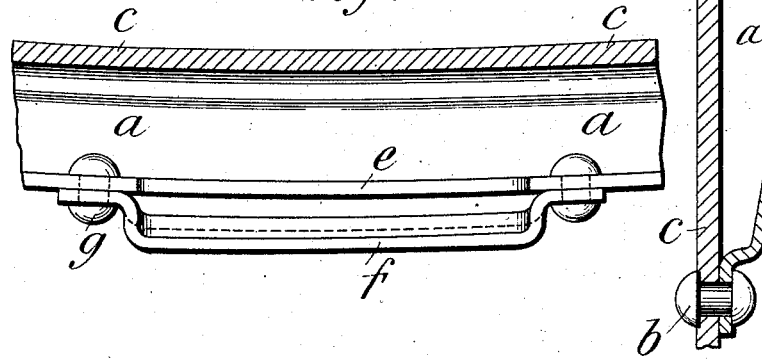
Figure 5:
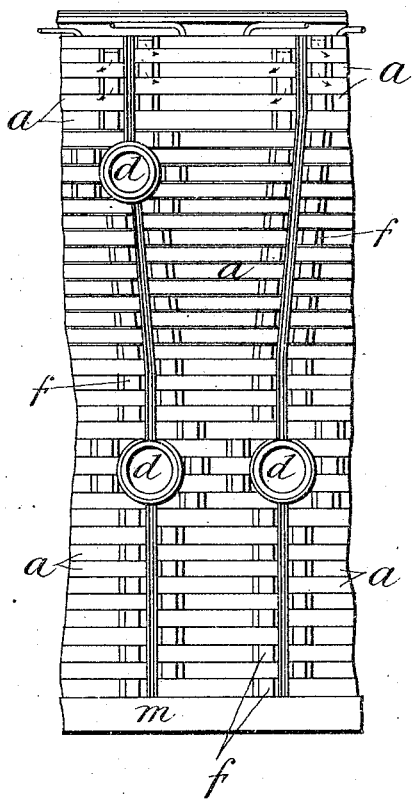

Referring to the accompanying drawings, Figure 1 represents in elevation part of two troughs for water-jacketing blast and other furnaces in accordance with this invention. The view shows one of the screens forming the outer wall of a duct for directing the overflow from one trough to the next below. Fig. 2 is a vertical section of Fig. 1. Fig. 3 is a plan of part of a trough and shows also the duct thereof. Fig. 4 is a vertical section of part of a blast-furnace, showing the water-jacketing applied. Fig. 5 is an elevation of a part of the jacketing. Two twyer-holes are shown toward the bottom of the jacketing and one twyer-hole higher up. Fig. 6 is a cross-section.

The troughs $a$, of which a few only are lettered in Figs. 4, 5, and 6 of the drawings, are riveted at foot by rivets $b$ to the usual casing-plate $c$ of the furnace. In the example illustrated in the drawings the troughs are made in varying lengths. They are closed watertight at each end. In Figs. 5 and 6 is seen how the troughs are arranged to accommodate the twyer-holes $d$. The like method is adopted in adapting the troughs to other apertures or to projections and the like. Each trough has an outlet, which is provided by a recess $e$ in the lip, as seen at Figs. 1, 2, and 3. Each outlet is guarded by a screen $f$, secured by rivets $g$ to the troughs $a$. The channels between the screens $f$ and the exterior of the troughs $a$ form ducts through which the overflowing water from any one trough is directed into the trough next below. Consequently the water descends in the troughs in a zigzagging course, and thus the waterjacketing provides a continuously downward flowing envelop of water, which, supplied at the top by supply-pipes $h$, is supplemented by further pipes $i\ j\ k\ l$ and as many others as may be desired and at any desired levels. Thus the furnace is wrapped in a water-jacket consisting of open-topped troughs arranged as above described. The water supplied to the troughs is drained off at the bottom of the jacketing by a draining-trough $m$. Similar draining-troughs may be placed at varying higher levels, enabling the water to be drained off at different heights, fresh cold water being supplied to the next stage below, and so on. Each trough may have a drainage-nozzle with cock fixed in it, so that any trough or troughs can be drained for cleaning purposes, the nozzles being adapted for attachment of hose-piping.

The screens or guards $f$ may extend all along each trough and may be higher than the troughs. In such case the water overflows the trough all along it and the recesses e are not required.

Under this invention the masonry of the furnace is jacketed on the outer surface and the casing-plate next to the masonry is covered with water, which being in open-topped troughs risk of explosion is obviated, and any local heating is readily detected by the vapor rising from the top of the trough where it may occur. The masonry being thus protected maintains an equal temperature, and consequently an equal thickness, thus avoiding "scaffolding" or arching of the charge. Should the water-supply fail, the troughs remain charged and are thus so far protected against injury by overheating.

In the application of this invention to cupolas and other furnaces—such as Siemens furnaces, reheating and melting furnaces—the troughs are similar in construction to those above described as for blast-furnaces.

The form of the troughs will vary with the conformation of the surfaces to which they are applied and with position and other local conditions.

What I claim is—

The combination with the casing or wall of a furnace, of a series of troughs adapted to be secured thereto, each trough being so shaped as to fit against the wall of said furnace and open at the top and one side and provided with a depression at its top for overflow purposes located near one end thereof, and a channeled plate secured to the outside of said trough substantially parallel to said trough and of substantially the same depth, whereby a conduit for the overflow-water is formed, said troughs being so arranged that said conduits are located at opposite ends of the troughs located in successive rows around the casing of the furnace, whereby a circulation of the water in a zigzag path is effected, substantially as described.

In testimony whereof I affix my signature in presence of two witnesses.

ANTHONY PATTERSON

Witnesses:
  STANLEY RALPH PATTERSON,
  ELIZA PATTERSON.